G. HAYES.

SKYLIGHT.

No. 10,581. Reissued Apr. 21, 1885.

Witnesses
Lemington Gifford
E. C. Roche

Inventor
George Hayes
by Gifford & Brown
Attys.

UNITED STATES PATENT OFFICE.

GEORGE HAYES, OF NEW YORK, N. Y.

SKYLIGHT.

SPECIFICATION forming part of Reissued Letters Patent No. 10,581, dated April 21, 1885.

Original No. 106,157, dated August 9, 1870; Reissue No. 8,675, dated April 15, 1879. Application for reissue filed March 19, 1885.

*To all whom it may concern:*

Be it known that I, GEORGE HAYES, of the city, county, and State of New York, have invented a new and useful Improvement in Skylights, applicable to conservatory and other glazed roofs, of which the following is a full, clear, and exact description, reference being had to the accompanying drawings, forming part of this specification, and in which—

Figure 1:
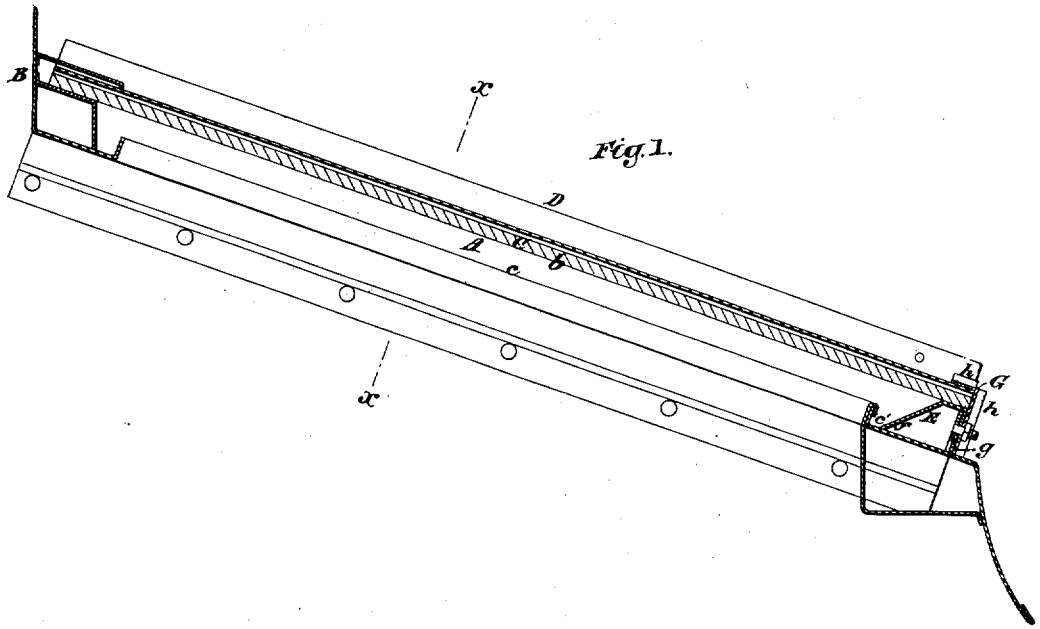
Figure 2:
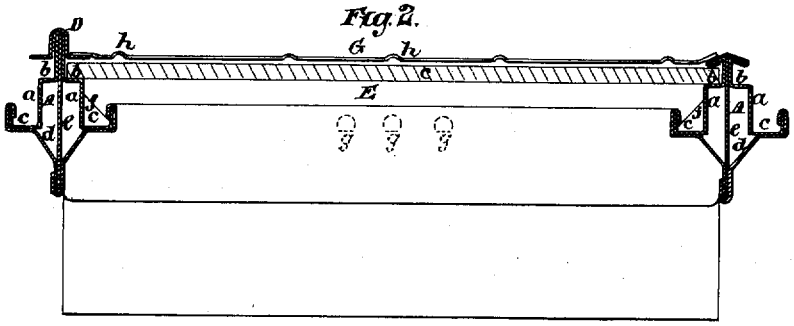
Figure 3:
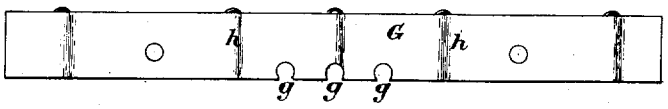

Figure 1 represents a vertical section of the one-half of a conservatory-roof constructed according to my improvement; Fig. 2, a section taken in a crosswise direction to Fig. 1, through the line *x x;* and Fig. 3, a front or side view of an end clip at foot of the roof, detached.

Similar letters of reference indicate corresponding parts.

My improvement relates to metal skylights or glazed roofs, and has for its object lightness combined with strength, as well as to effectually provide against leakage and the drifting of snow into or beneath the structure. Said improvement comprises a novel arrangement of stay-plate in the hollow metallic rafters of said structure, whereby great strength is secured without adding materially to the weight of the rafter; also, the improvement includes a novel construction of end clip and indirect arrangement of escape-openings from the main gutters, to provide for the escape of water and prevent snow from beating in, also contributing to strength.

Referring to the accompanying drawings, A A represent the hollow metallic rafters of the skylight or roof, varying in length, size, and number according to the area designed to be covered by the structure, and serving, in connection with cross-beams or transoms, to form a main frame. As applied to a conservatory-roof, said rafters run from the ventilator B to the wooden curbing. These rafters, as in another style of rafter described in an application which I have made for Letters Patent of the United States, are each composed of a sheet-metal body, *a*, bent to form rabbets *b b* for support of the panes or sheets of glass C along their sides or edges, and gutters *c c* for the escape of water beating or leaking into the structure; also formed with a lower V or other suitably shaped sheet-metal molding, *d*, bent at its upper edges to overlap and clip the upper edges of the gutters *c c;* but the rafter here shown differs from that described in a previous application, to which I have referred, in the introduction of a vertical sheet-metal stay-plate, *e*, arranged to extend from top to bottom of the rafter, including its molding *d*, and which, as thus arranged, serves materially to stiffen the rafter without materially adding to its weight, and that, by slightly increasing the thickness of, will give much additional strength to, the rafter, with the same thickness of shell or body to the latter.

The glass C, which is slid along the rabbets *b b*, is protected or covered at its edges by sheet-metal caps, which, as shown at D, may be of saddle or inverted-U shape, to better brace or stiffen the upper joint of the rafter that it is seated on and suitably secured to.

The cross-beams or transoms E have gutters C′, connecting with the longitudinal gutters *c c* of the rafters, to carry off the water formed by condensation or leakage.

Instead of making the outlets for escaping water from the lower cross-gutter in a direct line or manner to or over the frame F, that lies over the usual curbing, which arrangement facilitates the drifting in of snow to or over the glass, I cause the water from the gutters to escape by end outlets, *f f*, under cover of the lower hollow transom, and finally to pass off by apertures *g*, made intermediately of the latter, in the front thereof, and in the end clip, G, at the foot of the roof, which arrangement effectually provides against the beating in of snow to produce leakage.

The outlets *f f* may be covered by strainers, if desired.

The end clip, G, is made of angular form in its transverse section to cover the lower edge of the glass and to overlap the front face of the lower transom, E. Thus made and arranged, it prevents snow or rain driving in under the lower edge of the glass, and said clip is formed with corrugations *h h* in it, which not only give strength to the clip, but constitute gutters for water to run off from the glass.

What is here claimed, and desired to be secured by Letters Patent, is—

1. The arrangement of the vertical stay-plate *e* with the shell or body *a* of the rafter, molding *d*, rabbets *b b*, and gutters *c c*, substantially as specified.

2. The clip G, formed with corrugations *h*, made to constitute gutters, and arranged and applied relatively to the glass essentially as described.

3. The arrangement of the end outlets, *f f*, with the hollow body of the lower transom, E, and escape-apertures *g*, substantially as specified.

GEO. HAYES.

Witnesses:
T. J. KEANE,
LIVINGSTON GIFFORD.